United States Patent [19]

Sakakibara et al.

[11] Patent Number: 4,545,779
[45] Date of Patent: Oct. 8, 1985

[54] POWER TRANSMISSION ENDLESS BELT

[75] Inventors: Shiro Sakakibara, Toyokawa; Yoichi Hayakawa, Toyoake, both of Japan

[73] Assignee: Aisin Warner Kabushiki Kaisha, Anjo, Japan

[21] Appl. No.: 460,724

[22] Filed: Jan. 25, 1983

[51] Int. Cl.$^4$ .............................................. F16G 5/18
[52] U.S. Cl. .................................. 474/240; 474/251; 474/265; 474/242
[58] Field of Search ............... 474/240, 242, 244, 245, 474/248–251, 265, 201

[56] References Cited

U.S. PATENT DOCUMENTS

| | | | |
|---|---|---|---|
| 675,838 | 6/1901 | Capel | 474/240 |
| 1,691,892 | 11/1928 | Reeves | 474/245 |
| 2,403,607 | 7/1946 | Ogard | 474/242 |
| 4,313,730 | 2/1982 | Cole, Jr. et al. | 474/201 |
| 4,365,965 | 12/1982 | Russ, Sr. | 474/244 |

FOREIGN PATENT DOCUMENTS 0063152  5/1981  Japan .................................. 474/242

*Primary Examiner*—Stephen J. Novosad
*Assistant Examiner*—Thuy M. Bui
*Attorney, Agent, or Firm*—Blum·Kaplan Friedman Silberman & Beran

[57] ABSTRACT

A power transmission endless belt formed by connecting in succession a plurality of metal blocks each having at least a through hole or a recess to an endless connecting band formed by connecting a plurality of link plates with pins. The endless connecting band is inserted through the through hole or the recess of the metal block and the metal block is connected to the link plates with a pin or is retained between two pins.

7 Claims, 18 Drawing Figures

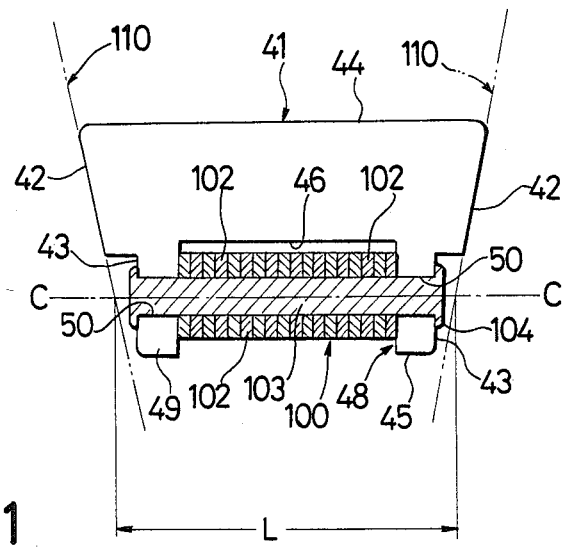
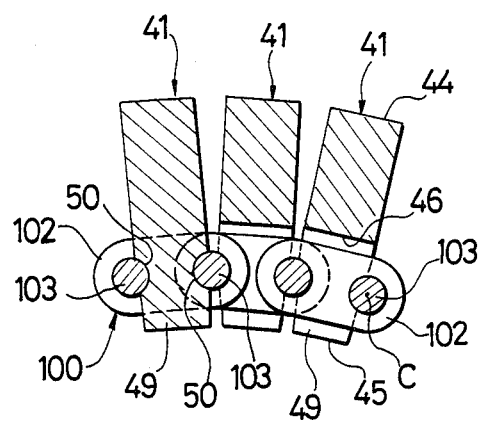
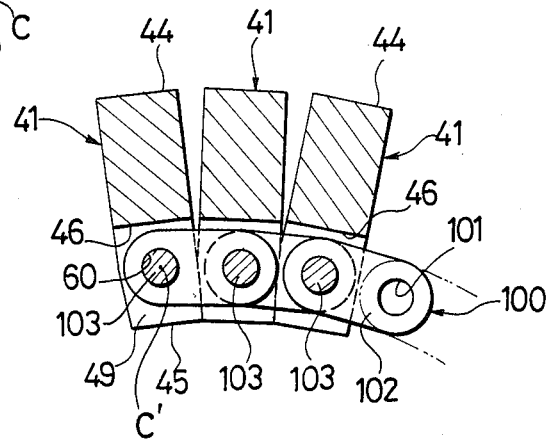

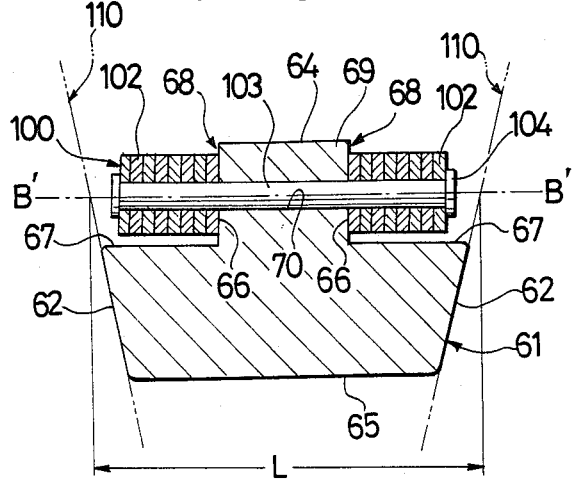
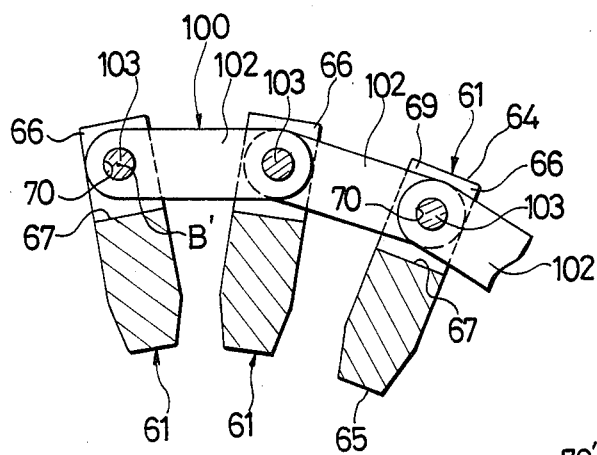
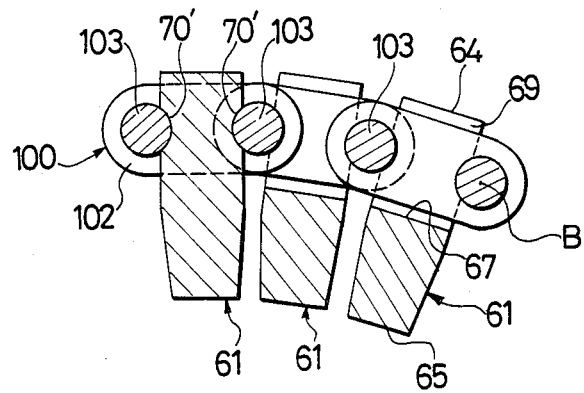

POWER TRANSMISSION ENDLESS BELT

BACKGROUND OF THE INVENTION

The present invention relates to an endless belt used in combination particularly with the pulleys of a belt drive continuously-variable speed automatic transmission.

Rubber V-belts have conventionally been used as power transmission endless belts which are used in combination particularly with the pair of pulleys of a belt drive continuously-variable speed automatic transmission to transmit torque from one to the other of the pair of pulleys, however, an endless belt formed by successively binding a plurality of plate-shaped metal blocks having the shape of the cross section of said V-belt with metal bands has become used in recent years when the power transmission belt is required of durability and high-torque transmitting performance.

An endless belt of this type is disclosed in Japanese Laid-Open Gazette for Pat. No. Sho 54-52253, wherein each of the metal blocks has a front shape which is the same with the cross section of the V-belt, that is, each metal block is formed in a trapezoidal plate having opposite side edges inclined so as to reduce the width of the trapezoidal plate along a direction from the outside toward the inside of the endless belt to form side edges to be brought in contact with the conical contact surface of the pulleys and having a thickness of around ¼ to 1/10 of the maximum width thereof, and recesses are formed in the opposite side edges at a position displaced outward of practically the middle position between the top (outside) edge and the bottom (inside) edge thereof to form metal band supporting surfaces, a plurality of such metal blocks are arranged side by side along the direction of the thickness thereof and are bound successively by means of metal bands by engaging the metal bands with the respective recesses of the metal blocks and part of the front and back sides of each metal block between the metal band supporting surfaces and the bottom edge are tapered toward the bottom edge to allow the arcuate bending of the endless belt around the center of the rotary shaft of the corresponding pulleys.

Such a belt of this type is less liable to wear or deteriorate during the extended period of use and is suitable for transmitting a high torque, particularly for transmitting power in a continuously-variable speed transmission in which each of the pair of pulleys consists of a pair of conical flanges resiliently pressed together by the agency of a spring force, one of the pair of pulleys is adapted so that the distance between the flanges can be changed by the agency of centrifugal force and a V-belt is extended between the pulleys. However, since above-mentioned conventional endless belt is formed by arranging a plurality of metal blocks side by side and by merely engaging metal bands in the recesses formed in the metal blocks, there is a possibility of the metal blocks come off the metal bands in extending the endless belt between the pulleys after assembling the endless belt or of side slip between the metal blocks and the metal bands during power transmitting operation due to difference in the accuracy of the metal blocks or the metal bands or in the frictional force working between the inclined contact surfaces of the metal blocks and the frictional contact surfaces of the pulleys between the right side and the left side of the power transmitting assembly to cause the partial wear or partial fatigue of the metal blocks and the pulleys resulting in the deterioration of the power transmission efficiency and, in the worst case, there is a possibility of the metal blocks come off the metal bands during operation.

Furthermore, since the metal bands are engaged merely with the respective recesses of the metal blocks and do not serve to transmit a driving force from one to the other pulley, while the driving force is transmitted from the contact surfaces of the driving pulley to the metal blocks which are in engagement with the driving pulley, then from the metal blocks which are in engagement with the driving pulley to the preceding metal blocks bound by the metal bands by the pushing action of the succeeding metal blocks, then to the metal blocks which are in engagement with the contact surfaces of the driven pulley, and then to the driven pulley. Therefore, such a conventional endless belt has a disadvantage that noises are generated due to the mutual collision of the metal blocks.

Furthermore, in another endless belt disclosed in Japanese Laid-Open Gazette for Pat. No. Sho 56-52647, adjacent metal blocks are connected by thin link plates. In such an endless belt, all the load applied to the endless belt is distributed to all the link plates, therefore, the power transmission capacity of the endless belt is limited by the number of the component link plates and the durability of the endless belt is deteriorated by the concentrated load applied to the junction between the metal blocks and the link plates.

SUMMARY OF THE INVENTION

Generally speaking in accordance with the present invention, an endless belt which is suitable for driving the pulleys of a belt drive continuously-variable speed automatic transmission is provided.

The present invention relates to a power transmission endless belt for transmitting torque between a pair of pulleys each having a contact surface defined by two coaxial and oppositely disposed conical surfaces, comprising a plurality of trapezoidal metal blocks each having inclined contact surfaces formed in the entire or part of both sides thereof and connected by endless connecting bands, wherein the metal block is formed in a trapezoidal front shape having above-mentioned inclined contact surfaces in the entire or part of the right and the left sides thereof and is provided with one or more through holes of a predetermined size formed across the thickness thereof or with one or more open recesses of a predetermined size extending along the thickness thereof, the endless connecting bands are equal in length, each endless connecting band is formed in an endless shape by connecting the respective opposite ends of links of a width to be inserted loosely through the through hole or the open recess with the ends of the adjacent links by means of pins, the endless connecting bands are inserted through the through hole or the open recesses of the metal blocks with at least one of pins of a link is interlocked with the corresponding metal block to connect a plurality of the metal blocks with the endless connecting bands so that a force transmitted to the metal block is transmitted to the following metal block through the endless connecting bands in the form of a tensile force.

Furthermore, the power transmission endless belt of the present invention is embodied that the respective main portions of the pins connecting the links of the endless connecting band are formed in a cylindrical shape and are disposed within the corresponding grooves formed in the front and the back surfaces of each metal block approximately at the middle between the top and the bottom sides of the through hole and having a cylindrical surface having a center axis intersecting the right and the left inclined contact surfaces at the same angle to hold each metal block between the pins in order to connect the metal blocks.

Still further, the power transmission endless belt of the present invention is embodied that, in connecting the metal blocks with the endless connecting bands, the pins connecting the links of the endless connecting bands are mounted pivotally to the right and the left sides of the through hole or recess of the metal blocks to connect the metal blocks successively with the endless metal band.

Accordingly, an object of the present invention is to provide an improved power transmission endless belt for use in combination with pulleys, particularly, the pulleys of a belt drive continuously-variable speed automatic transmission.

Another object of the present invention is to provide a power transmission endless belt for use in combination with above-mentioned pulleys, having improved durability.

A further object of the present invention is to provide a power transmission endless belt in which a driving force is transmitted by the endless connecting band successively connecting the metal blocks, the driving force transmitted from a driving pulley to the metal blocks is transmitted to the following metal blocks through the endless connecting band in the form of a tensile force and the endless connecting band itself has an increased transmission capacity.

BRIEF DESCRIPTION OF THE DRAWINGS

For a fuller understanding of the invention, reference is had to the following description taken in connection with the accompanying drawings, in which:

FIG. 10 is a front sectional view of a fifth embodiment of a power transmission endless belt according to the present invention, FIG. 11 is a longitudinal sectional view partly showing a different section of the power transmission endless belt of FIG. 10, FIG. 12 is a partial longitudinal sectional view of a sixth embodiment of a power transmission endless belt according to the present invention, FIG. 13 is a front sectional view of a seventh embodiment of a power transmission endless belt according to the present invention, FIG. 14 is a partial longitudinal sectional view of the power transmission endless belt of FIG. 13, FIG. 15 is a partial longitudinal sectional view partly showing a different section of an eighth embodiment of a power transmission endless belt according to the present invention.

DESCRIPTION OF THE PREFERRED EMBODIMENTS

Figure 1:
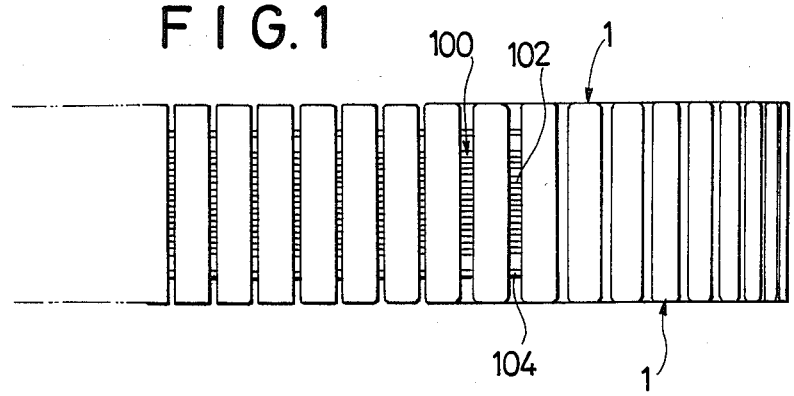
FIG. 1 is a partial top plan view of a first embodiment of a power transmission endless blet according to the present invention.
Figure 2:
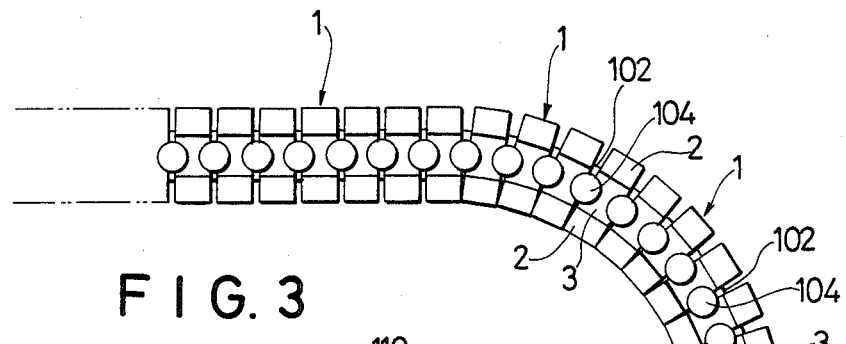
FIG. 2 is a partial side elevation of the power transmission endless belt of FIG. 1.
Figure 3:
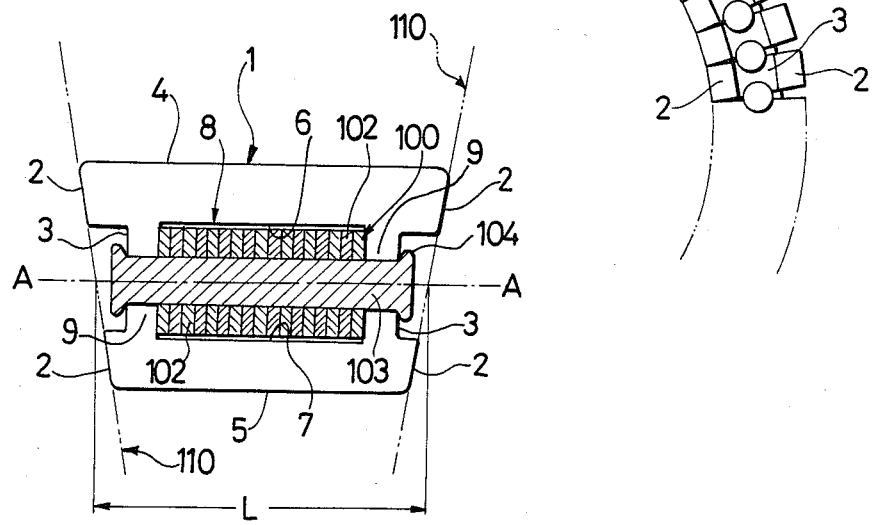
FIG. 3 is a partial front sectional view of the power transmission endless belt of FIG. 1.
Figure 4:
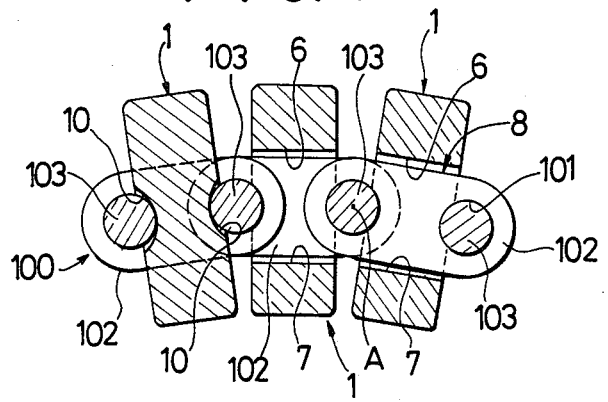
FIG. 4 is a partial longitudinal sectional view partly showing a different section of the power transmission endless belt of FIG. 1.

FIGS. 1 to 4 illustrate a first embodiment of a power transmission endless belt according to the present invention, in which FIG. 1 is a partial top plan view, FIG. 2 is a partial side elevation, FIG. 3 is a cross sectional view taken on a diameter of a pin of the endless connecting band and FIG. 4 is a partial longitudinal sectional view partly showing a different section, of the power transmission endless belt. Referring to FIGS. 1 to 4, the endless belt is formed by arranging a plurality of metal blocks 1 along the direction of the thickness of the metal block and by successively connecting the metal blocks 1 with an endless connecting band 100. As shown in FIG. 3, the front shape of the metal block 1 is formed in a trapezoidal shape having inclined contact surfaces 2, which are to be brought into contact with the conical contact surfaces 110 of a pulley, formed practically in the entire surfaces of the opposite sides, recesses 3 formed in the central portion of the respective inclined contact surface 2, a top side 4 and a bottom side 5 formed practically in parallel to each other. The metal block 1 has a uniform thickness. A rectangular through hole 8 is formed in the central part of the metal block 1 with respect to the top and bottom sides 4 and 5 as well as with respect to the opposite inclined contact surfaces 2 at a position falling in line with the recesses 3 with the top edge 6 and the bottom edge 7 of the through hole 8 extended in parallel at least to the top and bottom sides 4 and 5 of the metal block 1. Grooves 10 each having a cylindrical surface having a center axis A—A intersecting the right and the left inclined contact surfaces 2 at the same angle are formed on the front and the back surfaces of the metal block 1 practically in the central portion of the height of support walls 9 formed between the recesses 3 and the right and the left edges of the through hole 8.

The endless connecting band 100 is formed by arranging a plurality of thin metal link plates 102, each having a hole 101 at each end thereof, in parallel along the direction of the thickness thereof and then connecting the front ends of those link plates 102 and the rear ends of other link plates 102 disposed adjacently to the former link plates 102 in the direction of the thickness thereof by means of a pin 103, the main portion of which is formed in a cylindrical surface, and repeating the same connection until the link plates 102 are connected in the form of an endless belt. The width of the link plate 102 is slightly smaller than the distance between the top and bottom edges 4 and 5 of the rectangular through hole 8 of the metal block 1. A plurality of link plates 102 having the pin 103 fitted in the respective holes 101 formed in the respective front ends of those link plates 102 are inserted through the through hole 8 of the metal block 1 and are connected to a plurality of following link plates 102 by fitting the pin 103 in the hole 101 formed in the respective rear ends of those link plates 102 and in the respective holes 101 formed in the respective front ends of the following link plates 102 so that one metal block 1 is retained between two adjacent pins 103 of the endless connecting band 100. The distance between the holes 101 of each link plate 102 is designed so that the pins 103 are disposed contiguously to the corresponding grooves 10 of the metal block 1 to retain the metal block 1 therebetween or so that the pins 103 are disposed closely to the corresponding grooves 10 to restrain the metal block 1 from falling off, when the pins 103 are fitted in the holes 101 of the metal block 1. The axial length of the pin 103 is designed so that the pin 103 extends through the groove 10 of the metal block 1 along the center axis A—A of the groove 10 and the opposite ends thereof are positioned within the recesses 3. Both ends of the pin 103 is enlarged in diameter to form expanded portions 104 which restrict the axial movement of the pin 103. Naturally, the total length of the pin 103 is designed so that both ends of the pin 103 will not abut against the contact surfaces 110 of the corresponding pulley.

The width of the through hole 8 along the center A—A is ½ or greater of the distance L between the contact surfaces 110 of the corresponding pulley along the center axis A—A. The width of the endless connecting band 100 along the direction of the thickness of the link plates 102 is the same with the width of the through hole 8, namely, a width ½ or greater of the distance L.

When a power transmission endless belt formed by successively connecting the metal blocks 1 with the endless connecting band 100 in the manner as described hereinbefore is extended between a driving pulley and a driven pulley, the metal blocks 1 which are in contact at the inclined contact surfaces 2 thereof with the conical contact surfaces 110 of the driving pulley transmit the driving force of the driving pulley to the pins 103 of the endless connecting band 100 through the grooves 10. The driving force acts on the endless connecting band 100 in the form of a tensile force and is transmitted to the following metal blocks 1 which are engaged with the contact surfaces of the driven pulley and then to the driven pulley through the engagement of the inclined contact surfaces 2 of those metal blocks 1 with the contact surfaces of the driven pulley.

As described hereinbefore, whereas the above-mentioned conventional power transmission endless belt transmits a driving force through the pushing action of the succeeding metal blocks on the preceding metal blocks, the power transmission endless belt of the present invention transmits a driving force transmitted from a driving pulley to the preceding metal blocks 1, which are engaged with the driving pulley from those metal blocks 1 to the endless connecting band 100 in the form of a tensile force, which drives a driven pulley through the succeeding metal blocks 1 which are engaged with the driven pulley. Accordingly, in the power transmission endless belt of the present invention, the metal blocks are not required to be arranged closely without intervals therebetween, but the metal blocks may be arranged with intervals therebetween. Therefore, the weight of the power transmission endless belt of the present invention can be reduced and the generation of harsh metallic noises resulting from the contact between the metal blocks can be prevented. Furthermore, since the width of the endless connecting band 100 along the center axis A—A is ½ or greater of the distance between the inclined contact surfaces 110 of the pulley along the center axis A—A, the load transmitted to the metal blocks 1 is transmitted from the metal blocks 1 to the endless connecting band 100 through the wide contact area between the link plates 102 and the pin 103, therefore, the strength of the endless connecting band 100 will not be reduced and the durability of the power transmission endless belt is improved.

Figure 5:
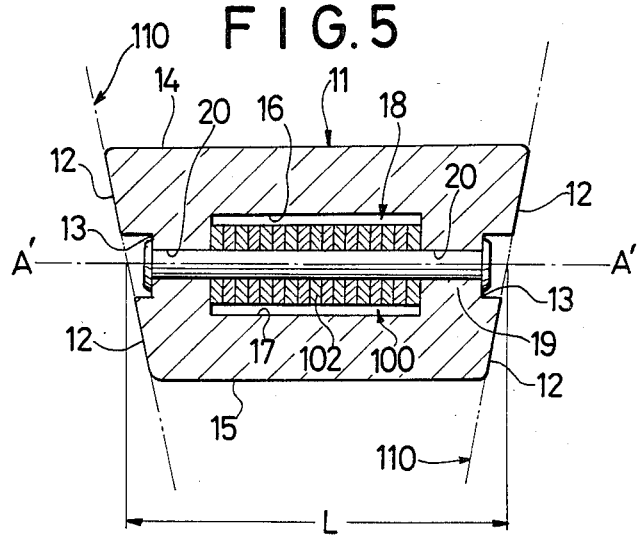
FIG. 5 is a cross sectional view of a second embodiment of a power transmission endless belt according to the present invention.
Figure 6:
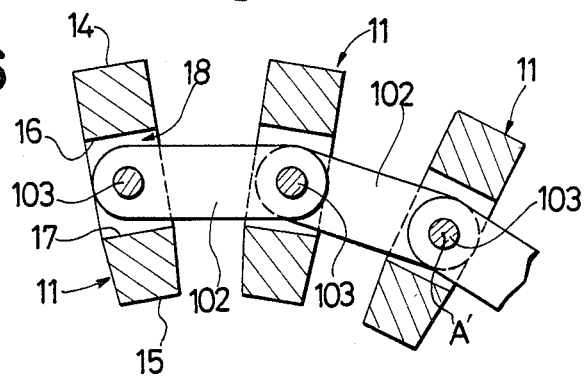
FIG. 6 is a partial longitudinal sectional view of the power transmission endless belt of FIG. 5.

FIG. 5 is a cross sectional view of a second embodiment of a power transmission endless belt according to the present invention and FIG. 6 is a longitudinal sectional view of the power transmission endless belt of FIG. 5. The front shape of the metal block 11 of this embodiment is practically the same with that of the metal block 1 of FIG. 3. Referring to FIGS. 5 and 6, the metal block 11 has a trapezoidal front shape and is provided with inclined contact surfaces 12 formed practically over the entire surfaces of the right and the left sides thereof, recesses 13 formed in the respective central parts of the inclined contact surfaces 12 and a rectangular through hole 18 formed at a position falling in line with the recesses 13 so that at least the top edge 16 and the bottom edge 17 of the through hole 18 are in parallels to the top and the bottom sides 14 and 15 of the metal block 11. Holes 20 having a center a axis A'—A' intersecting the right and the left inclined contact surfaces 12 practically at the same angle are drilled in support walls 19 formed between the through hole 18 and the recesses 13 at a position corresponding practically to the center of the height of the through hole 18, namely, practically the central portion between the top and the bottom sides 14 and 15 of the metal block 11. The thickness of the metal block 11 is practically uniform from the top side 14 through the vicinity of the bottom edge 17 of the through hole 18, while the metal block 11 is tapered from the vicinity of the bottom edge 17 of the through hole 18 toward the bottom side 15 thereof.

The construction of the endless connecting band 100 itself is the same with that of FIGS. 3 and 4, however, the pin 103 inserted through the holes 101 of the link plates 102 which are inserted into the through hole 18 of the metal block 11 is fitted in the holes 20 formed in the side walls 19 at the opposite ends thereof. The opposite ends of the pin 103 are enlarged in diameter within the recesses 13 to form expansions 104, so that the metal block 11 is connected to the endless connecting band 100.

In the second embodiment, the pin 103 connecting the link plates 102 of the endless metal band 100 also supports the metal block 11 pivotally, therefore, a driving force transmitted from a driving pulley to the preceding metal blocks 11 is transmitted to the succeeding metal blocks 11 through the pins 103 and the link plates 102 to drive a driven pulley. Accordingly, the succeeding metal blocks are not required, as in the first embodiment, to push the preceding metal blocks, so that the weight of the power transmission endless belt can be reduced by using elongate link plates 102 as shown in FIG. 6 to connect the metal blocks 11 at increased intervals.

Similarly to the first embodiment, the width of the endless connecting band 100 within the through hole 18 along the center axis A'—A' is ½ or greater of the distance L between the contact surfaces 110 along the center axis A'—A'.

More particularly, the metal blocks 1 and 11 as shown in FIGS. 3 to 6 are provided with the through holes 8 and 18, respectively, having a width of ½ or greater of the distance L between the contact surfaces 110 along the axis of the pin 103 connecting the metal block to the endless connecting band 100 and the endless connecting band 100 is formed by pivotally connecting a plurality of link plates 102 arranged closely along the direction of thickness within the through holes 8 and 18 for a width of ½ or greater of the distance L, therefore, the power transmitting capacity of the endless connecting band 100 can be increased and the partial wear of the link plates 102 can be prevented. The position of the through holes 8 and 18 may be closer to the top sides 4 and 14 or to the bottom sides 5 and 15, respectively, as compared with the position as shown in FIGS. 3 to 6.

Figure 7:
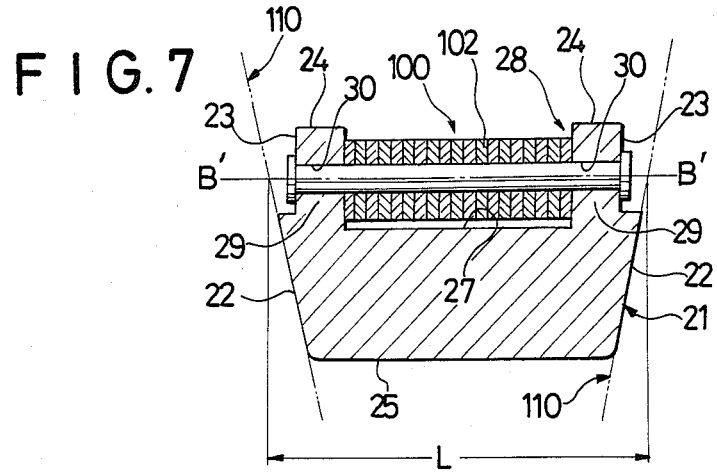
FIG. 7 is a front sectional view of a third embodiment of a power transmission endless belt according to the present invention.
Figure 8:
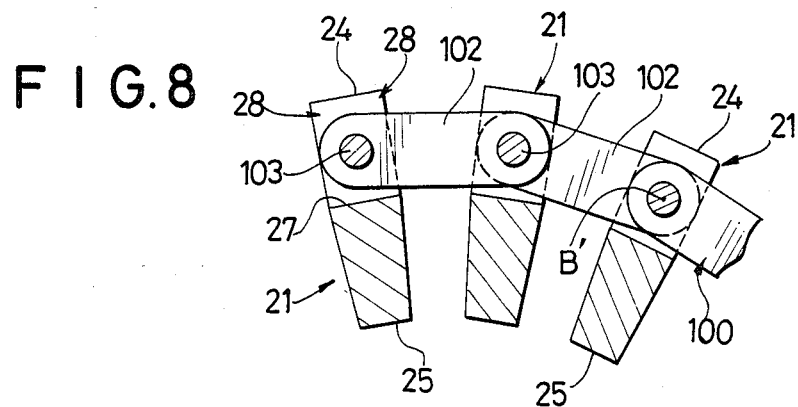
FIG. 8 is a partial longitudinal sectional view of the power transmission endless belt of FIG. 7.

FIG. 7 is a cross sectional view of a third embodiment of a power transmission endless belt according to the present invention and FIG. 8 is a partial longitudinal sectional view of the power transmission endless belt of FIG. 7. Whereas the metal blocks 1 and 11 of FIGS. 3 and 5 are provided holes 8 and 18, respectively, in the metal block 21 of this embodiment, the central portion with respect to the width of the top side 24 of the metal block 21 is recessed to form a U-shaped recess 28 having a bottom surface 27 extending in parallel to the bottom side 25 of the metal block 21. Recesses 23 falling in line with the recess 28 are formed in the upper edges of the inclined contact surfaces 22 which abut against the contact surfaces 110 of a pulley. The inclined contact surfaces 22 are formed in the lower halves of the right and the left sides, respectively, of the metal block 21. Holes 30 having a center axis B'—B' intersecting the extensions of the inclined contact surfaces 22 practically at the same angle are drilled in support walls 29 formed between the recess 28 and the recesses 23. The thickness of the metal block 21 is practically uniform from the top side 24 to the vicinity of the bottom surface 27 of the recess 28 and is tapered from the vicinity of the bottom surface 27 toward the bottom side 25.

The construction of the endless connecting band 100 is the same with that of the above-mentioned embodiment. The metal block 21 is connected to the endless connecting band 100 by arranging link plates 102 within the recess 28 with the lengthwise direction thereof in alignment with the direction of thickness of the metal block 21, fitting the opposite ends of a pin 103 inserted through the holes 101 of the link plates 102 in the holes 30 drilled in the walls 29 of the metal block 21 and by enlarging the opposite ends of the pin 103 in diameter within the recesses 23 to form expansions 104.

Figure 9:
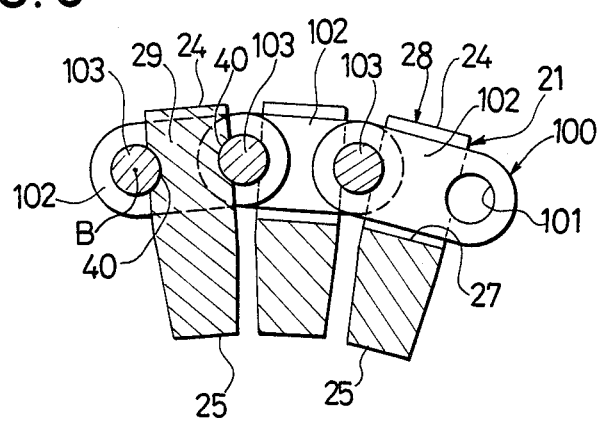
FIG. 9 is a partial longitudinal sectional view partly showing a different section of a fourth embodiment of a power transmission endless belt according to the present invention.

FIG. 9 is a partial longitudinal sectional view of a fourth embodiment of a power transmission endless belt according to the present invention. In this embodiment, the front shape of a metal block 21 is identical with that of the metal block 21 shown in FIG. 7, however, similarly to the metal block shown in FIGS. 3 and 4, grooves 40, each having a cylindrical surface having a center axis B—B which intersects the inclined contact surfaces 22 formed in the right and the left sides of the metal block 21 at the same angle, are formed in the front and the back surfaces of the wall 29, respectively, of the metal block, instead of drilling holes 31 in the walls 29. Therefore, the illustration of the front shape of the metal block 21 is omitted and in FIGS. 7 and 9 like parts are designated by like reference numerals. The endless connecting band 100 connects the metal blocks 21 by retaining one metal block 21 between a pair of pins 103 abutting against the corresponding grooves 40.

Also in the embodiments as shown in FIGS. 7 to 9, the width of the U-shaped recess 28 along the center axis B—B or B'—B' is ½ or greater of the distance L between the contact surfaces 110 of the pulley along the center axis B—B or B'—B' and the width of the endless connecting band 100 along the center axis B—B or B'—B' also is ½ or greater of the distance L. Thus, as mentioned above, the load capacity of the endless connecting band 100 can be increased and the partial wear of the link plates can be prevented.

FIG. 10 is a sectional view of a fifth embodiment of a power transmission endless belt according to the present invention, taken along the center axis of the pin of the endless connecting band and FIG. 11 is a longitudinal sectional view, partly showing a different section, of the power transmission endless belt of FIG. 10. The metal block 41 of this embodiment is provided with inclined contact surfaces 42, which abut against the contact surfaces 110 of a pulley, recesses 43 formed in the right and the left sides, respectively, adjacently to the bottom side 45, and a U-shaped recess 48 formed in the bottom side 45 in the central portion of the width of the bottom side 45 and having a bottom surface 46 extending in parallel to the top and the bottom sides 44 and 45. Grooves 50, each having a cylindrical surface of which center axis C—C intersecting the right and the left inclined contact surfaces 42 practically at the same angle, are formed in support walls 49 formed between the recess 48 and the recesses 43 practically at the middle of the height of the walls 49 on the front and the back surfaces, respectively, of the metal block 41. The thickness of the metal block 41 is practically uniform from the top side 44 to the portion of the walls corresponding to the center axis C—C of the grooves so and portion of the walls 49 below the center axis C—C is tapered toward the bottom side 45.

The purpose of the recess 48 of this embodiment is the same with that of the recess 28 of the third embodiment. An endless connecting band 100 is disposed in the recess 48 and similarly to the first embodiment shown in FIGS. 3 and 4, a pair of pins 103 inserted through the holes 101 of link plates 102 abut against the grooves 50 formed in the front and the back surfaces of the walls 49, respactively, of one metal block 41 to retain the metal block 41 therebetween. The opposite ends of the pin 103 are enlarged in diameter within the recesses 43 to form expansions 104, so that the metal block 41 is connected to the endless connecting band 100.

FIG. 12 is a partial longitudinal sectional view of a sixth embodiment of a power transmission endless belt according to the present invention. The front shape of the metal block 41 of this embodiment is identical with that of the metal block shown in FIG. 10. Whereas the metal block 41 of FIG. 10 is provided with grooves 50, each having a cylindrical surface having a center axis C—C, formed in the front and the back surfaces of the walls 49, the metal block 41 of the sixth embodiment is provided with coaxial holes 60 drilled in the walls 49 with the center axis C'—C' of the holes 60 in parallel to the center axis C—C. Accordingly, like parts of the metal block 41 are designated by like reference numeral through FIGS. 10 and 12 and the front elevation of the metal block 41 of the sixth embodiment is omitted. A pin 103 inserted through the holes 101 of the link plates 102 is fitted in the holes 60 to connect the metal block 41 to the endless connecting band 100.

In the embodiments of FIGS. 10 through 12, similarly to the embodiments of FIGS. 7 through 9, the width of the U-shaped recess 48 along the center axis C—C or C'—C' is ½ or greater of the distance L between the contact surfaces 110 of the pulley along the center axis C—C or C'—C' and the width of the endless connecting band 100 along the center axis C—C or C'—C' also is ½ or greater of the distance L.

FIGS. 13 and 14 are a cross sectional view and a partial longitudinal sectional view, respectively of a seventh embodiment of a power transmission endless belt according to the present invention. A metal block 61 is cut out from a plate of practically uniform thickness in a trapezoidal front shape having the right and the left inclined contact surfaces 62 which abut against the contact surfaces 110 of the pulley and practically parallel top and bottom sides 64 and 65 respectively. The corners between the top side 64 and the right and the left inclined contact surfaces are cut symmetrically with respect to the longitudinal center line of the metal block 61 to form recesses 68 each being formed of a surface 66 and a surface 67 which are perpendicular and parallel, respectively, to the top side 64. Thus a support wall 69 of a predetermined width is formed between the recesses 68. A hole 70 is formed in the support wall 69 practically at the central portion of the height of the surface 66 along a center axis B'—B' of the hole 70 which intersects the right and the left inclined contact surfaces 62 practically at the same angle.

An endless connecting band 100 is formed by disposing a plurality of link plates 102 each having holes 101 at the opposite ends thereof in the recesses 68 side by side and longitudinally in a zigzag arrangement, by inserting a pin 103 through the holes 101 of the link plates disposed in one of the recesses 68, the hole 70 formed in the support wall 69 and the link plates 102 disposed in the other recess 68, and then forming expansions 104 at the opposite ends of the pin 103. Thus the metal block 61 is connected pivotally to the endless connecting band 100 by means of the pin 103. Portion of the metal block 61 near the bottom side 65 thereof is tapered toward the bottom side 65.

FIG. 15 is a partial longitudinal sectional view partially showing different sections of an eighth embodiment of a power transmission endless belt according to the present invention. The front shape of the metal block 61 of this embodiment is identical with that of the metal block of the seventh embodiment shown in FIG. 13, except that grooves 70' having a cylindrical surface having a center axis B—B which is parallel to the center axis B'—B' are formed in the front and the back surfaces of the support wall 69, whereas in the seventh embodiment shown in FIG. 13, a hole 70 is formed in the support wall 69 along the center line B'—B'. Accordingly, the cross sectional view of the metal block 61 is not illustrated and like parts in FIGS. 13 and 15 are designated by like reference numerals. The metal block 61 is retained between a pair of pins 103 abutting against the grooves 70' formed in the metal block 61, so that the metal blocks 61 are connected in succession to the endless connecting band 100.

Whereas a single through hole or a single recess each of a predetermined width is formed practically in the middle portion of a metal block between the inclined contact surfaces thereof in the embodiments as shown in FIGS. 3 and 5 having the through holes 8 and 18 respectively and in the embodiments as shown in FIGS. 7 and 10 having the recesses 28 and 48 respectively, in the embodiments shown in FIGS. 13 through 15, instead of forming a through hole or a recess each of a predetermined width, two recesses 68 are formed by cutting the corners between the top side 64 and the right and the left inclined contact surfaces 62, the endless connecting band 100 is divided into two sets of the link plates, each set of link plates is disposed in each recess 68 and those two sets of link plates are connected with a single common pin 103 to form a single endless connecting band. Furthermore, in the embodiments shown in FIGS. 13 through 15, the width of the support wall 69 along the center axis B—B or B'—B' is ½ or smaller of the distance L between the contact surfaces 110 of the pulley along the center axis B—B or B'—B', while the total width of the endless connecting band 100 including the total thickness of the link plates 102 disposed in those two recesses 68 is ½ or greater of the distance L. Although the link plates 102 of the endless connecting band 100 are divided into two parts and are disposed side by side in the recesses 68 formed on the opposite sides of the support wall 69 in the embodiments shown in FIGS. 13 through 15, the load capacity of the endless connecting band 100 can be increased and the partial wear of the link plates can be prevented, since the link plates disposed in the different recesses 68 are supported by a single common pin 103 and the total width of the endless connecting band 100 along the center axis B—B or B'—B' is ½ or greater of the distance L.

Figure 16:
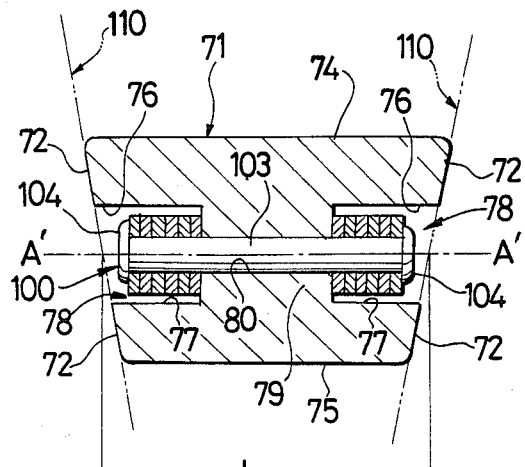
FIGS. 16 and 17 are front sectional view of ninth and tenth embodiment, respectively, of a power transmission endless belt according to the present invention.
Figure 17:
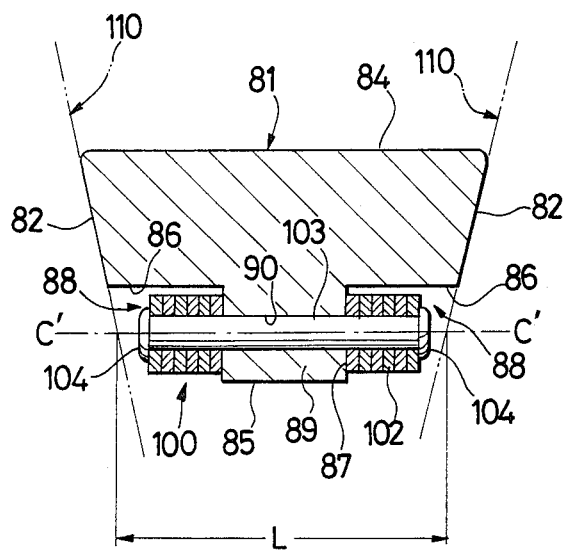

FIGS. 16 and 17 are front sectional views of a ninth and a tenth embodiments, respectively, of a power transmission endless belt according to the present invention. Referring to FIG. 16, a metal block 71 has right and left inclined contact surfaces 72, practically parallel top and bottom sides 74 and 75, recesses 78 each having surfaces 76 and 77 which are parallel to the bottom side 75 and being formed in the inclined contact surfaces 72 practically at the middle of the height of the inclined contact surfaces 72 by cutting the inclined contact surfaces 72 and a hole 80 having a center axis A'—A' intersecting the right and the left inclined surfaces 72 practically at the same angle and being formed in a support wall 79 formed between the recesses 78.

Referring to FIG. 17, a metal block 81 has right and left inclined surfaces 82, recesses 88 formed in symmetrical in shape with respect to the longitudinal center axis of the metal block 81 by cutting the corners between the bottom side 85 and the inclined contact surfaces 82 of a trapezoidal plate along a plane 86 and a plane 87 which are parallel and perpendicular, respectively, to the bottom side 85 and a hole 90 having a center axis C'—C' intersecting the right and the left inclined contact surfaces 82 practically at the same angle and being drilled through a support wall 89 formed between the recesses 88.

When the metal block 71 or 81 is used, both ends of the pin 103 of the endless connecting band 100 fitted in the hole 80 or 90 formed in the support wall 79 or 89 are inserted through the holes 101 of a plurality of link plates 102 to connect the link plates 102 in the shape of an endless belt, so that the metal blocks 71 or 81 are connected in succession to the endless connecting band 100. Since the embodiments shown in FIGS. 16 and 17 are analogous to the embodiments shown in FIGS. 6 and 12, respectively in the longitudinal section, the longitudinal sectional views thereof will be omitted.

With a metal block which is identical with the metal block shown in FIGS. 16 or 17 in the front shape, it is possible to connect the metal blocks in succession to the endless connecting band 100 by retaining the metal block between a pair of pins 103 of the endless connecting band 100 by making those pins 103 abut against grooves having a cylindrical surface having a center axis A—A or C—C and being formed practically in the central portion of the front and the back surfaces of the support wall 79 or 89, instead of connecting the metal block to the endless connecting band 100 by means of the pin 103 fitted in the hole 80 or 90 drilled through the support wall 79 or 89. The longitudinal section of such a metal block is analogous to the longitudinal sections shown in FIGS. 4 or 11. Although the illustration of embodiments employing such a metal block as described immediately above is omitted, it is believed that the construction and the function thereof can readily be understood from what has been described hereinbefore with regard to the foregoing embodiments.

Similarly to the metal block 61 shown in FIG. 13, the metal block 71 or 81 as shown in FIGS. 16 or 17 is provided with two recesses 78 or 88 having a predetermined total width, opening into the inclined contact surfaces 72 or 82 and formed in the central portion of the metal block 71 along the center axis A'—A' or in the bottom corners adjacent to the bottom side 85 of the metal block 81 along the center axis C'—C' and with a support wall 79 or 89 formed between the recesses 78 or 88 and having a width of ½ or smaller of the distance L between the contact surfaces of the pulley along the center axis A'—A' or C'—C'. In the embodiment employing the metal blocks 71 or 81, the link plates 102 consisting the endless connecting band 100 are divided into two parts of the succession of the link plates 102 and those two parts of the link plates 102 are disposed in both recesses 78 or 88 and are connected with a single common pin 103, thus forming a single endless connecting band. The width of the endless connecting band 100, namely, the total thickness of the link plates connected to one metal block, along the center axis A'—A' or C'—C' is ½ or greater of the distance L.

In the embodiments shown in FIGS. 16 and 17, similarly to those embodiments shown in FIGS. 13 through 15, the endless connecting band 100 is divided into two assemblies of link plates 102 and the two assemblies of link plates 102 are disposed in the recesses 78 or 88 opening into the right and the left inclined surfaces of the metal block 71 or 81, however, since those assemblies of link plates are joined with a single pin 103 to form a single endless connecting band 100, the component link plates 102 of each assembly are disposed side by side and closely in each of the recesses 78 or 88, which are formed in the metal block symmetrically with respect to the longitudinal center axis of the metal block and are connected to the metal block with the pin 103 and the total width of the endless connecting band 100 joined with the pin 103 along the center axis B'—B' or C'—C' is ½ or greater of the distance L, so that the endless connecting band 100 is suitable to transmit a large load and still further, since the link plates are joined adjacently with the pin 103 in a predetermined width, the partial wear of the junctions between the link plate 102 and the pin 103 can be reduced, so that the durability of the endless connecting band 100 can be improved.

Figure 18:
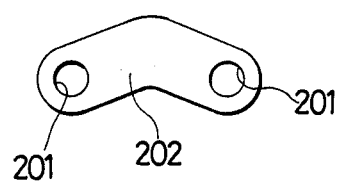
FIG. 18 is a side elevation of a link of a modified form.

The link plate 102 of the endless connecting band 100 employed in the above-mentioned embodiments is shown as formed in a straight configuration, however, a curved link plate 202 having holes 201 at the opposite ends thereof and being curved toward on side of a line connecting those holes 201 as shown in FIG. 18 may be employed to allow the distance between the holes 201 to change due to the elastic deformation of the link plate 202 itself when a tensile force is applied between the pin 103 fitted in the holes 201 and to attain uniform contact between the link plates 202 and the pins 103 so that the deformation of the pins 103 and the partial wear of the holes 201 of the link plate 202 can be prevented.

As described hereinbefore with reference to a plurality of embodiments, the present invention provides a power transmission endless belt formed by connecting in succession a plurality of trapezoidal metal blocks having inclined contact surfaces formed in part or over the entire area of the right and the left sides thereof so as to be in contact with the contact surfaces of a pair of pulleys each having the contact surfaces formed by disposing two conical surfaces coaxially and opposite to each other and adapted to transmit a driving force from one to the other of the pair of pulleys, comprising a plurality of metal blocks each being formed in a trapezoidal front shape and having the inclined contact surfaces formed in part or over the entire area of the right and the left sides thereof and one or two through holes or recesses of a predetermined width cut through the metal block in the direction of thickness thereof at the middle between the inclined contact surfaces or symmetrically with respect to the longitudinal center axis of the metal block and an endless connecting band formed by endlessly and longitudinally connecting a plurality of link plates at the respective opposite ends, wherein the width of the endless connecting band is designed so that the component link plates can loosely be inserted into the through hole or the recess, the endless connecting band is inserted through the through hole or the recess, at least one pin of the endless connecting band is associated with one of the metal blocks to connect the metal block to the endless connecting band and a driving force transmitted to the preceding metal blocks is transmitted to the succeeding metal blocks through the endless connecting band.

According to the present invention, the metal block is associated with and connected to the endless connecting band with at least one of pins connecting the opposite ends of a link plate to the corresponding ends of adjacent link plates, therefore, a driving force transmitted from a driving pulley to the metal blocks through the contact between the conical contact surfaces of the driving pulley and the right and the left inclined contact surfaces of the metal blocks is transmitted to the endless connecting band in the form of a tensile force, so that the driving force is transmitted to all the succeeding metal blocks and then, to the driven pulley through the inclined contact surfaces of the succeding metal blocks which are in engagement with the contact surfaces of the driven pulley.

Accordingly, in transmitting a driving force by means of a conventional power transmission endless belt which is adapted to transmit the driving force by pushing the preceding metal block with the succeeding metal block, the metal blocks are required to be arranged in succession without any interval therebetween to attain the transmission of the driving force, however, with regard to the power transmission endless belt of the present invention, the transmission of a driving force can be secured even if the metal blocks are arranged at intervals and since it is only necessary to secure the area of the inclined contact surfaces corresponding to the driving force to be transmitted, the number of the metal blocks can be reduced in proportion to the magnitude of the driving force to form intervals between the metal blocks, and further the number of the link plates can be reduced, so that the weight of the power transmission endless belt can be reduced in proportion to the magnitude of the driving force and the generation of metallic noises attributable to collision between the metal blocks can remarkably be reduced.

Furthermore, when grooves having a cylindrical surface are formed on the front and the back sides of the metal block and the metal block is retained between a pair of pins of the endless connecting band by making the pins abut against the grooves in embodying the present invention, the metal block can simply be produced through a shaping process without requiring any drilling work, so that the power transmission belt can be formed through simple works, while when a hole for receiving a pin is drilled in the metal block, since the pins connecting the opposite ends of a link plate and the corresponding ends of adjacent link plates also connects the metal block to the endless connecting band, the power transmission endless belt assembling work is facilitated.

As mentioned above, in a power transmission endless belt adapted to transmit the driving force of a driving pulley through the endless connecting band connecting metal blocks in succession, sufficient strength and durability of the junctions of the link plates are required to transmit a large driving force and according to the present invention, one or two through holes or recesses of a predetermined width are formed at the middle between the right and the left inclined contact surfaces or symmetrically with respect to the longitudinal center axis of the metal block and an endless connecting band consisting of link plates arranged in a width corresponding to the predetermined width and connected longitudinally to each other is inserted through the through hole in a single endless band or the endless connecting band is divided in width into two parts and those parts are disposed in the right and the left recesses, therefore, a sufficient predetermined axial contact length is provided between the pin connecting the link plates and the link plates and hence the strength of connection of the link plates is increased. As described particularly with regard to each embodiment, since the width of the link plate arrangement along the axial direction of the pin connecting the corresponding ends of the link plates is ½ or greater of the distance between the contact surfaces of the pulley along the same axial direction, the strength of connection between the link plates can sufficiently be increased.

Particularly, when an endless connecting band formed by arranging a plurality of thin link plates side by side along the direction of the thickness thereof and connecting the respective opposite ends of the link plates to the corresponding ends of longitudinally adjacent link plates with pins, as shown in the drawings, is employed, the increase in the number of the link plates can be allowed and thereby the load for each link plate can be reduced, so that the strength of the link can be increased with a compact constitution of the power transmission endless belt. Besides, the strength of the pin can be increased by increasing the number of the link plates even when the diameter of the pin is reduced and an endless connecting band of a desired strength can be formed without increasing the thickness of the metal blocks.

Still further, according to the present invention, when an endless connecting band is constituted by connecting a plurality of short link plates with pins as in the embodiments shown in the drawings, one metal block can be retained with a single pin or with a pair of pins therebetween, however, when a small driving force is required to be transmitted, the longitudinal connection of two link plates or the longitudinal connection of several link plates is regarded as one link unit and one metal block may be provided for every link unit or the number of the link plates arranged axially of the pin per one link unit can be reduced. When an increased load is applied to the endless connecting band, the number of the link plates arranged axially of the pin can be increased to reduce the load allotted to every link plate and the durability of the pin can also be enhanced even when a pin of a smaller diameter is employed by increasing the number of the link plates in the axial direction thereof.

Still further, the power transmission endless belt of the present invention comes in contact with the pulleys only at the inclined contact surfaces formed in the right and the left sides of the trapezoidal metal blocks, therefore, the respective configurations of the top side and the bottom side of each trapezoidal metal block may be formed in any shape, provided that the top and the bottom sides will not contact the pulleys and that no deflective force is applied to the power transmission endless belt by the centrifugal force during operation and since the same conditions apply to the respective forms of the through hole and the recesses, the front shape of the metal block of the present invention is not limited necessarily to the symmetrical shape with respect to the longitudinal center axis of the metal block as shown in the drawings.

What is claimed is:

1. A power transmission endless belt for transmitting a torque from one to the other of a pair of pulleys each having contact surfaces formed of two coaxially and oppositely disposed conical surfaces, comprising:

a plurality of metal blocks each being formed of a trapezoidal plate having right and left sides, front and back surfaces, inclined contact surfaces formed at least in part of the entire area of the right and the left sides as viewed from the front thereof, at least one through hole or recess of a predetermined width cut through the thickness of said metal block and first and second grooves formed in each of the front and back surfaces of the metal block respectively, said grooves having a cylindrical surface; and an endless connecting band formed of a plurality of links of similar length longitudinally and endlessly connected at the respective opposite ends thereof, said endless connecting band having a width capable of being loosely fitted in said through hole or in said recess in said metal block, said endless connecting band being inserted longitudinally through said through hole or said recess formed in said metal block along the direction of the thickness of said metal block, a first pin disposed in said first groove formed in the front surface of said metal block and pivotably joining the ends of longitudinally adjacent links and a second pin disposed in the second groove formed in the back surface of the metal block and pivotably joining the ends of longitudinally adjacent links, each said metal block being retained between a first and a second pin and thereby coupled to the endless connecting band.

2. A power transmission endless belt according to claim 1, wherein said grooves have a depth less than one-half the diameter of said pins in order that said blocks may pivot about said pins.

3. A power transmission endless belt according to claim 1, wherein said through hole is formed practically at the middle between the inclined contact surfaces formed in the right and the left sides, as viewed from the front, through the thickness of the metal block with the right and the left edges extending practically perpendicularly to said center axis.

4. A power transmission endless belt according to claim 1, wherein said recess is formed practically at the middle between the inclined contact surfaces formed in the right and the left sides, as viewed from the front, of the metal block along the direction of the thickness of the metal block with the right and the left sides thereof extending practically perpendicularly to said center axis and opening into the top or the bottom side of said metal block.

5. A power transmission endless belt according to claim 1, wherein said recess is formed at the middle in each of the inclined contact surfaces formed in the right and the left sides, as viewed from the front, of said metal block along the direction of the thickness of the metal block with the top and the bottom sides thereof extending practically in parallel to said center axis and symmetrically with respect to the longitudinal center axis of the metal block.

6. A power transmission endless belt according to claim 1, wherein said recesses are formed at symmetrical positions with respect to the longitudinal center axis of the metal block in the top or the bottom corners of the metal block and have end faces extending perpendicularly to said center axis.

7. A power transmission endless belt according to claim 1, wherein said endless connecting band is formed in an endless form by arranging thin link plates of practically the same length side by side along the thickness thereof in a width which is practically the same with the width of said through hole or said recess and by pivotally connecting one of the longitudinal ends of each of said link plates and the corresponding end of a laterally adjacent link plate.

* * * * *